Figure 1:
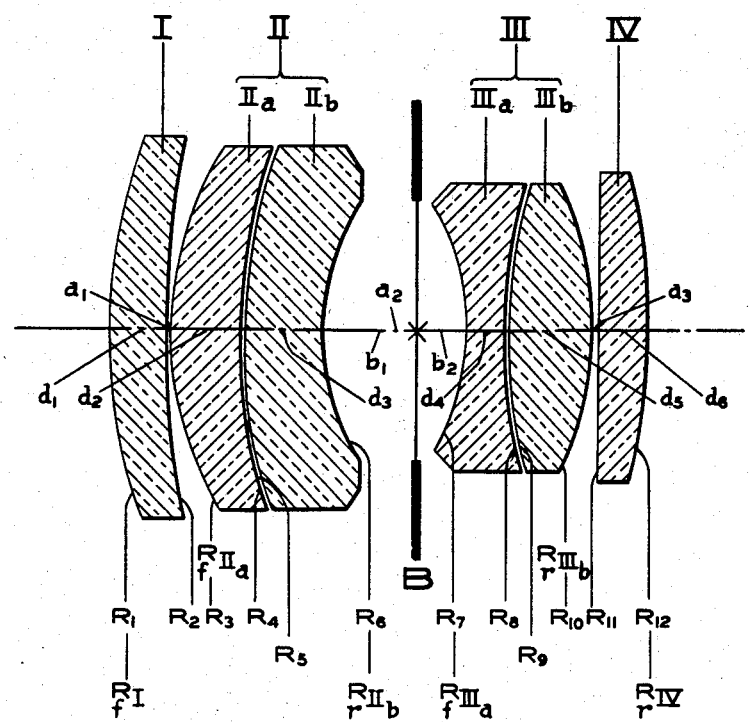

Feb. 3, 1953          A. W. TRONNIER          2,627,205
CORRECTED FOUR-UNIT PHOTOGRAPHIC OBJECTIVE COMPRISING
TWO HALF SYSTEMS ENCLOSING THE DIAPHRAGM

Filed Dec. 28, 1950          2 SHEETS—SHEET 1

INVENTOR
ALBRECHT WILHELM TRONNIER

BY *Mock + Blum*

ATTORNEYS

INVENTOR
ALBRECHT WILHELM TRONNIER
BY Mock & Blum
ATTORNEYS

Patented Feb. 3, 1953

2,627,205

UNITED STATES PATENT OFFICE 2,627,205

CORRECTED FOUR-UNIT PHOTOGRAPHIC OBJECTIVE COMPRISING TWO HALF SYSTEMS ENCLOSING THE DIAPHRAGM

Albrecht Wilhelm Tronnier, Gottingen, Germany, assignor to Voigtlander & Sohn Aktiengesellschaft, Braunschweig, Germany, a corporation of Germany Application December 28, 1950, Serial No. 203,180
In Switzerland January 13, 1950

5 Claims. (Cl. 88—57)

This invention relates to a photographic objective of the modified Gauss-type, which has high light-transmitting capacity, is corrected spherically, chromatically, astigmatically and for coma and is distinguished by a substantial improvement of the lateral correction in comparison with known objectives of the beforementioned type.

The main object of the present invention is to provide a photographic objective of the above mentioned type in which an improved simultaneous combined effect of correction for coma and anastigmatic image field flatness with small zonal aberrations is attained by a specific distribution of the refractive indices of the lens elements in combination with a specific distribution of the lens curvatures.

Numerous other objects, advantages and features of this invention are set forth in the following description and the annexed drawings, which include some examples of the invention, to which the invention is not limited.

The photographic objective of high light-transmitting capacity according to the present invention is contemplated for taking photographic pictures and for projection, and is corrected spherically, chromatically, astigmatically, and for coma. The objective according to this invention belongs to a modified Gauss-type. It consists of a system of four individual structural lens units, the central air-space of which serves as the diaphragm space. In this system, the two outer lens units have a distinct converging effect and consist preferably of individual, and, in this case uncemented, positive lenses. The two inner lens units of the system are composed of two members and have altogether a distinct diverging effect. These two inner units are enclosed by the two outer units in the following manner: the radii of curvature of the outer lens surfaces of the two inner units, i. e. the units adjacent the diaphragm, have such values and are convex toward the respective outer units in such a manner that, on the one hand, the diverging surfaces of highest dioptric effect are turned toward the diaphragm in both halves of the system, and, on the other hand, the converging surfaces of highest dioptric effect, of the positive lens elements in the two halves of the system, are each turned away from the diaphragm.

In the new objectives according to the present invention a substantial improvement of the lateral correction is attained in comparison with the objectives of high light-transmitting capacity of the conventional Gauss-type. In the latter either anastigmatic image flatness with relatively small zonal aberrations is attained, together with a simultaneous, considerable overcorrection for coma of widely open pencils, or a moderate correction of zonal aberrations in combination with a strong curvature of the astigmatic image shells.

It has now been found that a considerable improvement with regard to the simultaneous correction with small zonal aberrations, of both kinds of aberrations and a combination of both types of correction can be attained according to the present invention by combining a specific distribution of refractive indices within the dioptrically highly effective lenses of the two lens units which follow the diaphragm and are located on the side of the shorter conjugate, with the simultaneous application of the curvatures according to the invention, of the two inner lens units of the objective system, enclosing the diaphragm.

In order to clearly explain the invention, the four units of the present modification of the Gauss-type objective are denoted in the enclosed drawings in the order of their position I, II, III, IV and the individual elements of the units consisting of more than one element are denoted by an index consisting of a small letter of the alphabet (for example $II_a$, $II_b$ or $III_a$, etc.). Furthermore, the glasses used are characterized by their mean refractive indices consecutively numbered starting at the side of the longer conjugate and proceeding toward the side of the shorter conjugate (for example $n_1$, $n_2$, $n_3$ ... etc.). In order to identify the radii of curvature, they are denoted by an index $f$ if in their unit they are on the side of the longer conjugate, i. e. on the front side in the meaning of the photographic picture, while the radii of curvature which are in their unit on the rear side in the meaning of the photographic picture, i. e. on the side of the shorter conjugate, are denoted by an index $r$.

The photographic objective according to the present invention has the following characteristics:

The two inner lens units (II and III) which enclose the diaphragm and have all together a diverging effect, have, according to the invention, such curvature that their two outer radii turned toward the adjacent outer units I and IV—i. e. radii $R_{fII_a}$ and $R_{rIII_b}$—have values, the sum of which is positive and clearly greater than zero; moreover, the refractive indices of the lens glasses show a continuous increase in the direction of the shorter conjugate, i. e. in the meaning of the photographic picture, in the lenses adjacent the image side, starting at the center of the system, said increase being characterized, on the one hand, in that the difference between the arithmetic mean value of the refractive indices of the glasses of the diverging lenses ($II_b$ and $III_a$) enclosing the diaphragm, and the refractive index of the outer lens (IV) turned away from the diaphragm, is distinctly greater than 0.0370, and, on the other hand, simultaneously each individual step of this specific increase of the refractive indices of these glasses from $$\frac{n_3+n_4}{2}$$

to $n_5$ and from $n_5$ to $n_6$, is plainly greater than 0.0185.

Using the above explained reference symbols, the characteristics of my present invention can be expressed as follows:

$$(A) R_{fII_a} + R_{rIII_b} > 0$$

$$(B_1) n_6 - \frac{n_3+n_4}{2} > 0.0370$$

$$(B_2) n_5 - \frac{n_3+n_4}{2} > 0.0185$$

and $$n_6 - n_5 > 0.0185$$

By denoting the arithmetical mean of the refractive indices of the two diverging lenses $II_b$ and $III_a$ enclosing the diaphragm, by $$\frac{n_3+n_4}{2} = n_z$$

the above combined conditions ($B_1$) and ($B_2$) can also be expressed as follows:

$$(B_1)' \quad n_6 - n_z > 0.0370$$
$$(B_2)' \quad n_5 - n_z > 0.0185$$

and $$n_6 - n_5 > 0.0185$$

Thus, the invention is characterized by a combination $A+B_1+B_2$. This means a combination of the specifically selected values of the outer curvatures of the two inner units, with the progressive increase of the refractive indices according to the invention, of the objective rear part arranged on the side of the shorter conjugate, of the total objective.

For one half of a Gauss-type objective, and also for a lens position following the diaphragm, a sequence of refractive indices increasing from the diaphragm in the direction of the light, has been suggested in the German Patent No. 439,556. However, it was not recognized then that the combination of (a) a particularly strong and progressive increase of the refractive indices with (b) the above outlined distribution of the outer curvatures of the inner units of the total objective, enclosing the diaphragm, is necessary in order to obtain the simultaneous combined effect of correction for coma and anastigmatic image field flatness with small zonal aberrations. This new combination according to my invention results in the elimination of disadvantages of known photographic objectives of the type here in question and in an objective of new and improved structure.

Figure 2:
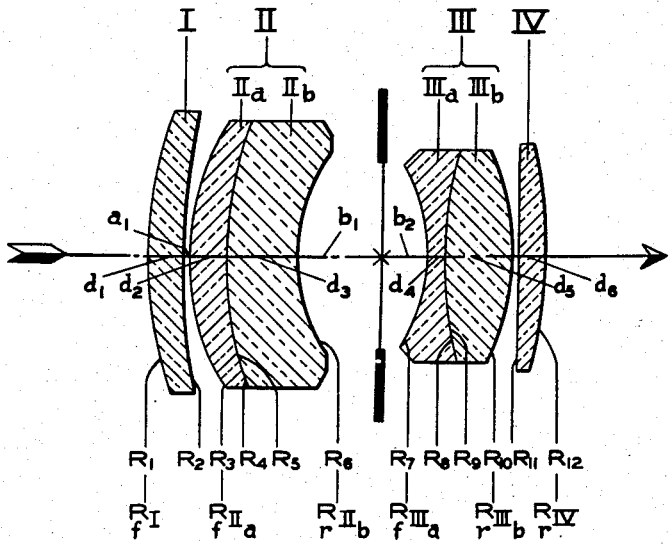
Figure 3:
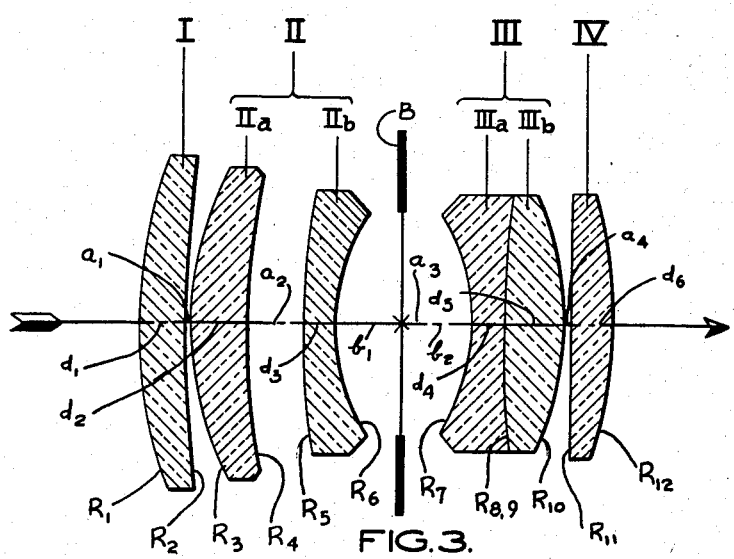
Figure 4:
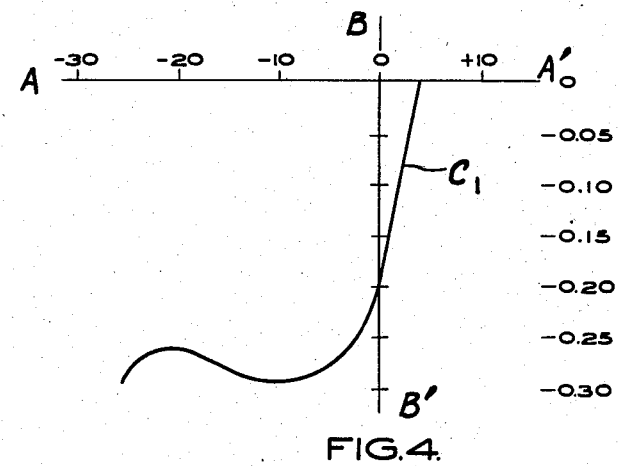

In the appended drawings, Figure 1 is a general structural illustration of the invention and shows the reference numerals used in the present application. Figure 2 illustrates an objective of lower light-transmitting capacity according to the present invention, in which the two inner units II and III consist of cemented lenses. Figure 3 illustrates an objective of higher light-transmitting capacity, according to the invention. Figure 4 shows the curve of meridional coma in the form of zonal image height aberrations of a Gauss-type objective corresponding to the state of prior art, while Figure 5 shows the corresponding aberrations of the example of my invention for the same inclination of the prinsipal rays on the side of the object and for the same cross-section of rays.

The objective shown in conventional manner in axial section in Figure 2, is contemplated for reproduction purposes and represents a projector objective of a medium-sized image angle, having a relative aperture of 1:2.7 at a useful image field extension of about 50°.

The constructive details of the example illustrated in Figure 3, are shown in the following table. In this example, the inner unit II, which is composed of two elements, arranged on the side of the longer conjugate and precedes the diaphragm in the meaning of the photographic picture, consists of two uncemented individual lenses of opposite power, which are separated by a meniscus-shaped air layer. The relative aperture of this objective shown in Figure 3 by way of example, amounts to 1:2.3, and its useful image field amounts to 50°.

Figure 5:
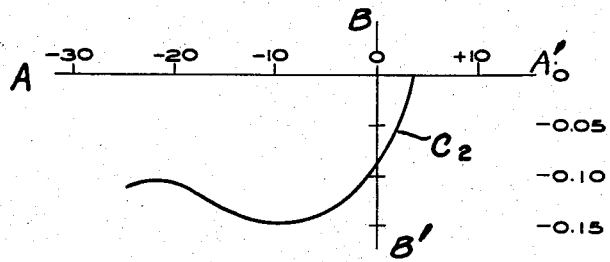

In Figure 5, the division of the axis of abscissas is equal to that in Figure 4, and the division of the axis of ordinates has the same magnitude of intervals as in Figure 4.

In conformity with the following table, in the drawings R denotes the radii of curvature and $d$ the thickness of the lenses, the distances of which in the air are denoted $a$. The refractive indices of the glasses used are stated for the blue light of the Fraunhofer line F with a wave length of 4861 AE, while the color dispersion of these glasses is characterized by the Abbé number $\nu$. The diaphragm located between the inner units II and III is denoted B. The paraxial intersectional width of the objective, determining the length of the shorter conjugate, for objects at infinite distance, referred to rays near the axis, is denoted $p_0'$. The data of this example refer to a focal length of 1, while the respective sections along the lens axis in Figure 3 are illustrated for a focal length of $f=150$ mm. in natural size.

Numerical example

[f = 1.0   1:2.3   p₀' = 0.698]

| | | | | |
|---|---|---|---|---|
| $R_1 = +0.64174$ | $d_1 = 0.06108$ | | $n_1 = 1.62856$ | $\nu_1 = 60.3$ |
| $R_2 = +1.78419$ | $a_1 = 0.00394$ | | air | |
| $R_3 = +0.44511$ | $d_2 = 0.07290$ | | $n_2 = 1.66758$ | $\nu_2 = 57.0$ |
| $R_4 = +1.08963$ | $a_2 = 0.07290$ | | air | |
| $R_5 = +0.97278$ | $d_3 = 0.04138$ | | $n_3 = 1.63245$ | $\nu_3 = 36.2$ |
| $R_6 = +0.27540$ | $a_3 = 0.18423$ | $b_1 = 0.08867$ $b_2 = 0.09556$ | diaphragm space | |
| $R_7 = -0.27540$ | $d_4 = 0.03941$ | | $n_4 = 1.66045$ | $\nu_4 = 33.9$ |
| $R_8 = +1.78419$ $R_9 = R_8$ | | | | |
| $R_{10} = -0.40689$ | $d_5 = 0.08079$ | | $n_5 = 1.66782$ | $\nu_5 = 50.9$ |
| $R_{11} = +3.63341$ | $a_4 = 0.00197$ | | air | |
| $R_{12} = -0.62343$ | $d_6 = 0.05911$ | | $n_6 = 1.70254$ | $\nu_6 = 53.5$ |

The above figures show the following:

$$R_3 = +0.44511$$
$$R_{10} = -0.40689$$
$$\overline{R_3 + R_{10} = +0.03822}$$

The figure $+0.03822$ is clearly greater than zero and is plainly positive, thus corresponding to condition A.

Furthermore,
$$n_3 = 1.63245$$
$$n_4 = 1.66045$$
$$\overline{n_3 + n_4 = 3.29290}$$
$$n_z = 3.29290 : 2 = 1.64645$$

The conditions B₁ and B₂ are met as follows:

(B₁) $n_6 - n_z = 1.70254 - 1.64645 = 0.05609$, i. e. clearly greater than 0.0370. The individual steps in the increase of refractive indices are:

(B₂) $n_5 - n_z = 1.66782 - 1.64645 = 0.02137$, i. e. clearly greater than 0.0185; simultaneously, $n_6 - n_5 = 1.70254 - 1.66782 = 0.03472$, i. e. clearly greater than 0.0185.

The arithmetical mean of the refractive indices $n_3$, $n_4$ of the two inner negative lenses is higher than 1.635. The radii of curvature of the individual refractive surfaces are in the following ranges:

$$0.4\ F < R_1 < 0.8\ F$$
$$1.0\ F < R_2 < 2.5\ F$$
$$0.3\ F < R_3 = R_{fII_a} < 0.6\ F$$
$$0.5\ F < R_4 < 5.0\ F$$
$$0.5\ F < R_5 < 5.0\ F$$
$$0.18\ F < R_6 = R_{rII_b} < 0.38\ F$$
$$0.18\ F < R_7 = R_{fIII_a} < 0.38\ F$$
$$0.4\ F < R_8 < 4.0\ F$$
$$0.4\ F < R_9 < 4.0\ F$$
$$0.30\ F < R_{10} = R_{rIII_b} < 0.6\ F$$
$$1.0\ F < R_{11} < \infty$$
$$0.5\ F < R_{12} < 1.0\ F$$

wherein $R_1$, $R_2$ . . . denote the radii of curvature of the successive lens surfaces counting from the front and $F$ denotes the equivalent focal length of the total objective.

The focal length of the individual structural lens units (I, II, III, IV) are in the following ranges:

$$1.0\ F < f_1 < 2.5\ F$$
$$1.5\ F < -f_{2_3} < 3.5\ F$$
$$1.5\ F < -f_{4_5} < 3.5\ F$$
$$0.5\ F < f_6 < 1.5\ F$$

wherein $f_1$, $f_{2_3}$, $f_{4_5}$, $f_6$ are the focal lengths of said individual structural lens units counting from the front.

An important improvement attained by the objective of the present invention is demonstrated by the curves shown in Figures 4 and 5.

The curve in Figure 4 shows the meridional coma in the form of zonal image height aberrations in an objective of a relative aperture of 1:2 and focal length of 100 mm., which belongs to the class of modified Gauss-type objectives here in question, consists of four lens units comprising altogether six lenses and represents the latest state of the art prior to the present invention. (See H. Zollner, Foto-Kino-Technik, No. 3/1949, Figure 2(c).) In this curve, tangential coma is shown for an angle of inclination of 19°, the abscissas corresponding to the height of the rays in a plane passing through the vertex of the front surface of the objective, perpendicularly to the optical axis. The axis of coordinates corresponds to the highest incident ray, in Figure 4.

As a comparison, Figure 5 shows the corresponding aberration curve in the case of an objective according to the present Figure 3 and the above table, for an angle of inclination of 16° 54′ 11″.

In Figures 4 and 5 each, the axis of abscissas is denoted AA′ and the axis of ordinates BB′. The curve of tangential coma in Figure 4 is denoted $c_1$ and the curve of the corresponding aberration in Figure 5 is denoted $c_2$.

Calculation of the aberration curves of Figures 4 and 5 shows that the pear-shaped disc or image produced under the conditions stated as a result of coma in the above mentioned objective of the prior art, has a height of 0.295 mm., while the pear-shaped disc produced in the objective of the present invention under the stated equal conditions, has a height of 0.146 mm. only.

In the objectives compared, the aberration curves show a similar course, and, therefore, the form of their pear-shaped discs is likewise similar, and, in view of the equal section of rays, the intensity of light is proportional to the surface area. Therefore, the comparable ratio of intensities is, with very close approximation, proportional to the ratio of squares of the heights of the pear-shaped discs of zonal aberration.

In the above comparison, the ratio of the heights is $$\frac{0.295}{0.146} = 2.021$$

and the ratio of intensities is $$2.021^2 = 4.08$$

This means that under equal conditions the effective cross-section of the pear-shaped disc in the case of an objective embodying the present invention, amounts to 24.5% only, in comparison with similar objective representing the latest state of the art prior to the present invention, or, in other words, the objective of the present invention is capable of showing four times smaller details than said objective of the prior art.

In the appended drawings, $b_1$ denotes the distance between the diaphragm and the adjacent front member (I and II) on the side of the major conjugate and $b_2$ denotes the distance between the diaphragm and the rear member (III and IV) on the side of the major conjugate.

It will be understood that the present invention is not limited to the specific materials, structures, values and other specific details described above and illustrated in the drawings and may be carried out with various modifications without departing from the scope of the invention as defined in the appended claims.

What is claimed is:

1. Photographic objective of high light-transmitting capacity, comprising two halves of a system enclosing a diaphragm; each of said half systems being composed of (a) a unit adjacent the diaphragm, comprising two adjacent lens elements of opposite power, and (b) a converging unit turned away from the diaphragm; wherein the dioptrically most effective diverging surfaces, i. e. the inner surfaces adjacent the diaphragm of said units adjacent the diaphragm, are turned toward the diaphragm in both halves of the system, and the dioptrically most effective converging surfaces of the positive elements in the two halves of the system, i. e. the outer surface of each outer converging unit in the two halves of the objective and the outer surface of each of the two units enclosing the diaphragm, are turned away from the diaphragm; the dioptrically most effective converging surfaces, which limit the inner units enclosing the diaphragm on the side turned away from the diaphragm, in both halves of the system, being shaped in such a manner that the sum of their radii is clearly greater than zero and thus has a plainly positive value; furthermore, the refractive indices of the lens glasses showing a continuous increase in the direction of the shorter conjugate, i. e. in the meaning of the photographic picture, in the lenses adjacent the image side, said increase starting at the center of the system, in such a manner that the difference between the refractive index of the outer lens arranged on the image side and turned away from the diaphragm and the arithmetical mean of the refractive indices of the glasses of the individual diverging lens elements enclosing the diaphragm, is distinctly greater than 0.0370 and simultaneously each and every individual step of this specific increase of the refractive indices is greater than 0.0185; the radii of curvature of the individual refractive surfaces being in the following ranges:

$0.4\ F < R_1 < 0.8\ F$
$1.0\ F < R_2 < 2.5\ F$
$0.3\ F < R_3 = R_{fII_a} < 0.6\ F$
$0.5\ F < R_4 < 5.0\ F$
$0.5\ F < R_5 < 5.0\ F$
$0.18\ F < R_6 = R_{rII_b} < 0.38\ F$
$0.18\ F < R_7 = R_{fIII_a} < 0.38\ F$
$0.4\ F < R_8 < 4.0\ F$
$0.4\ F < R_9 < 4.0\ F$
$0.30\ F < R_{10} = R_{rIII_b} < 0.6\ F$
$1.0\ F < R_{11} < \infty$
$0.5\ F < R_{12} < 1.0\ F$ wherein $R_1, R_2 \ldots$ denote the radii of curvature of the successive lens surfaces counting from the front and $F$ denotes the equivalent focal length of the total objective.

2. Photographic objective of high light-transmitting capacity, comprising two halves of a system enclosing a diaphragm; each of said half systems being composed of (a) a unit adjacent the diaphragm, comprising two adjacent lens elements of opposite power, and (b) a converging unit turned away from the diaphragm; wherein the dioptrically most effective diverging surfaces, i. e. the inner surfaces adjacent the diaphragm of said units adjacent the diaphragm, are turned toward the diaphragm in both halves of the system, and the dioptrically most effective converging surfaces of the positive elements in the two halves of the system, i. e. the outer surface of each outer converging unit in the two halves of the objective and the outer surface of each of the two units enclosing the diaphragm, are turned away from the diaphragm; the dioptrically most effective converging surfaces, which limit the inner units enclosing the diaphragm on the side turned away from the diaphragm, in both halves of the system, being shaped in such a manner that the sum of their radii is clearly greater than zero and thus has a plainly positive value; furthermore, the refractive indices of the lens glasses showing a continuous increase in the direction of the shorter conjugate, i. e. in the meaning of the photographic picture, in the lenses adjacent the image side, said increase starting at the center of the system, in such a manner that the difference between the refractive index of the outer lens arranged on the image side and turned away from the diaphragm and the arithmetical mean of the refractive indices of the glasses of the individual diverging lens elements enclosing the diaphragm, is distinctly greater than 0.0370 and simultaneously each and every individual step of this specific increase of the refractive indices is greater than 0.0185; the radii of curvature of the individual refractive surfaces being in the following ranges:

$0.4\ F < R_1 < 0.8\ F$
$1.0\ F < R_2 < 2.5\ F$
$0.3\ F < R_3 = R_{fII_a} < 0.6\ F$
$0.5\ F < R_4 < 5.0\ F$
$0.5\ F < R_5 < 5.0\ F$
$0.18\ F < R_6 = R_{rII_b} < 0.38\ F$
$0.18\ F < R_7 = R_{fIII_a} < 0.38\ F$
$0.4\ F < R_8 < 4.0\ F$
$0.4\ F < R_9 < 4.0\ F$
$0.30\ F < R_{10} = R_{rIII_b} < 0.6\ F$
$1.0\ F < R_{11} < \infty$
$0.5\ F < R_{12} < 1.0\ F$ wherein $R_1, R_2 \ldots$ denote the radii of curvature of the successive lens surfaces counting from the front and $F$ denotes the equivalent focal length of the total objective; the focal lengths of the individual structural lens units being in the following ranges:

$1.0\ F < f_1 < 2.5\ F$
$1.5\ F < -f_{2_3} < 3.5\ F$
$1.5\ F < -f_{4_5} < 3.5\ F$
$0.5\ F < f_6 < 1.5\ F$ wherein $f_1, f_{2_3}, f_{4_5}$ and $f_6$ are the focal lengths of said individual structural lens units counting from the front.

3. Photographic objective of high light-transmitting capacity, comprising two halves of a system enclosing a centrally arranged diaphragm; each of said half-systems being composed of (a) a unit adjacent the diaphragm, comprising two adjacent lens elements of opposite power, and (b) a converging lens turned away from the diaphragm; wherein the dioptrically most effective diverging surfaces, i. e. the inner surfaces adjacent the diaphragm, of said units adjacent the diaphragm, are turned toward the diaphragm in both halves of the system, and the dioptrically most effective converging surfaces of the positive elements in the two halves of the system, i. e. the outer surface of each outer converging lens in both halves of the objectives and the outer surface of each of the two lens units enclosing the diaphragm, are turned away from the diaphragm; the refractive indices of the lens glasses showing a continuous increase starting at the center of the objective, in the direction of the shorter conjugate, i. e. in the meaning of the photographic picture, in the lenses arranged on the image side, in such manner that the difference between the refractive index of the outer lens arranged on the image side and turned away from the diaphragm, and the arithmetical mean of the refractive indices of the glasses of the individual diverging lens elements adjacent to and enclosing the diaphragm, is distinctly greater than 0.0370, and simultaneously each and every individual step of this specific increase of the refractive indices is greater than 0.0185, and, furthermore, in at least three of the four converging lenses of the objective, the refractive indices for the yellow $d$-line of the helium spectrum are higher than 1.62 and, simultaneously, the arithmetical mean of the refractive indices of all lenses of the objective, is likewise higher than 1.62; the dioptrically most effective converging surfaces, which limit the inner units enclosing the diaphragm on the sides turned away from the diaphragm, in both halves of the system, being shaped in such manner that the sum of their radii of curvature is clearly greater than zero and has a positive value, and the ratio of the radius of curvature of the first convex lens surface, in the direction of light, to the radius of curvature of the convex outer surface, which limits, in the direction of the object, the composite lens group preceding the diaphragm, being smaller than 1.550; the radii of curvature of the individual refractive surfaces being in the following ranges:

$0.4\,F < R_1 < 0.8\,F$
$1.0\,F < R_2 < 2.5\,F$
$0.3\,F < R_3 = R_{fII_a} < 0.6\,F$
$0.5\,F < R_4 < 5.0\,F$
$0.5\,F < R_5 < 5.0\,F$
$0.18\,F < R_6 = R_{fII_b} < 0.38\,F$
$0.18\,F < R_7 = R_{fIII_a} < 0.38\,F$
$0.4\,F < R_8 < 4.0\,F$
$0.4\,F < R_9 < 4.0\,F$
$0.30\,F < R_{10} = R_{fIII_b} < 0.6\,F$
$1.0\,F < R_{11} < \infty$
$0.5\,F < R_{12} < 1.0\,F$ wherein $R_1, R_2 \ldots$ denote the radii of curvature of the successive lens surfaces counting from the front and $F$ denotes the equivalent focal length of the total objective.

4. Photographic objective of high light-transmitting capacity, comprising two halves of a system enclosing a centrally arranged diaphragm; each of said half systems being composed of (a) a unit adjacent the diaphragm, comprising two adjacent lens elements of opposite power, and (b) a converging lens turned away from the diaphragm; wherein the dioptrically most effective diverging surfaces, i. e. the inner surfaces adjacent the diaphragm, of said units adjacent the diaphragm, are turned toward the diaphragm in both halves of the system, and the dioptrically most effective converging surfaces of the positive elements in the two halves of the system, i. e. the outer surface of each outer converging lens in both halves of the objectives and the outer surface of each of the two lens units enclosing the diaphragm, are turned away from the diaphragm; the refractive indices of the lens glasses showing a continuous increase starting at the center of the objective, in the direction of the shorter conjugate, i. e. in the meaning of the photographic picture, in the lenses arranged on the image side, in such manner that the difference between the refractive index of the outer lens arranged on the image side and turned away from the diaphragm, and the arithmetical mean of the refractive indices of the glasses of the individual diverging lens elements adjacent to and enclosing the diaphragm, is distinctly greater than 0.0370, and simultaneously each and every individual step of this specific increase of the refractive indices is greater than 0.0185, and, furthermore, in at least three of the four converging lenses of the objective, the refractive indices for the yellow $d$-line of the helium spectrum are higher than 1.62 and, simultaneously, the arithmetical mean of the refractive indices of all lenses of the objective, is likewise higher than 1.62; the dioptrically most effective converging surfaces, which limit the inner units enclosing the diaphragm on the sides turned away from the diaphragm, in both halves of the system, being shaped in such manner that the sum of their radii of curvature is clearly greater than zero and has a positive value, and the ratio of the radius of curvature of the first convex lens surface, in the direction of light, to the radius of curvature of the convex outer surface, which limits, in the direction of the object, the composite lens group preceding the diaphragm, being smaller than 1.550; the radii of curvature of the individual refractive surfaces being in the following ranges:

$0.4\,F < R_1 < 0.8\,F$
$1.0\,F < R_2 < 2.5\,F$
$0.3\,F < R_3 = R_{fII_a} < 0.6\,F$
$0.5\,F < R_4 < 5.0\,F$
$0.5\,F < R_5 < 5.0\,F$
$0.18\,F < R_6 = R_{fII_b} < 0.38\,F$
$0.18\,F < R_7 = R_{fIII_a} < 0.38\,F$
$0.4\,F < R_8 < 4.0\,F$
$0.4\,F < R_9 < 4.0\,F$
$0.30\,F < R_{10} = R_{fIII_b} < 0.6\,F$
$1.0\,F < R_{11} < \infty$
$0.5\,F < R_{12} < 1.0\,F$ wherein $R_1, R_2 \ldots$ denote the radii of curvature of the successive lens surfaces counting from the front and $F$ denotes the equivalent focal length of the total objective; the focal lengths of the individual structural lens units being in the following ranges:

$1.0\,F < f_1 < 2.5\,F$
$1.5\,F < -f_{2_3} < 3.5\,F$
$1.5\,F < -f_{4_5} < 3.5\,F$
$0.5\,F < f_6 < 1.5\,F$ wherein $f_1$, $f_{2_3}$, $f_{4_5}$ and $f_6$ are the focal lengths of said individual structural lens units counting from the front.

5. Photographic objective of high light-transmitting capacity, comprising two halves of a system enclosing a centrally arranged diaphragm; each of said half systems being composed of (a) a unit adjacent the diaphragm, comprising two adjacent lens elements of opposite power, and (b) a converging lens turned away from the diaphragm; wherein the dioptrically most effective diverging surfaces, i. e. the inner surfaces adjacent the diaphragm, of said units adjacent the diaphragm, are turned toward the diaphragm in both halves of the system, and the dioptrically most effective converging surfaces of the positive elements in the two halves of the system, i. e. the outer surface of each outer converging lens in both halves of the objectives and the outer surface of each of the two lens units enclosing the diaphragm, are turned away from the diaphragm; said objective having the numerical data set forth in the following table, wherein $R_1$, $R_2$ . . . denote the radii of curvature of the successive lens surfaces counting from the front, $d_1$, $d_2$ . . . the axial thicknesses of the individual lens elements, $a_1$, $a_2$ . . . the distances in air, $n_1$, $n_2$ . . . the refractive indices for the blue light of the Fraunhofer line F with a wave length of 4861 AE, $\nu_1$, $\nu_2$ . . . are the Abbé numbers of the individual lens elements and the objective has a focal length of 1.0, a relative aperture of 1:2.3 and a paraxial intersectional width of 0.698:

| | | | | |
|---|---|---|---|---|
| $R_1=+0.64174$ | $d_1=0.06108$ | | $n_1=1.62856$ | $\nu_1=60.3$ |
| $R_2=+1.78419$ | $a_1=0.00394$ | | | |
| $R_3=+0.44511$ | $d_2=0.07290$ | | $n_2=1.66758$ | $\nu_2=57.0$ |
| $R_4=+1.08963$ | $a_2=0.07290$ | | | |
| $R_5=+0.97278$ | $d_3=0.04138$ | | $n_3=1.63245$ | $\nu_3=36.2$ |
| $R_6=+0.27540$ | $a_3=0.18423$ | $b_1=0.08867$ | | |
| | | $b_2=0.09556$ | | |
| $R_7=-0.27540$ | $d_4=0.03941$ | | $n_4=1.66045$ | $\nu_4=33.9$ |
| $R_8=+1.78419$ | | | | |
| $R_9=R_8$ | $d_5=0.08079$ | | $n_5=1.66782$ | $\nu_5=50.9$ |
| $R_{10}=-0.40689$ | $a_4=0.00197$ | | | |
| $R_{11}=+3.63341$ | $d_6=0.05911$ | | $n_6=1.70254$ | $\nu_6=53.5$ |
| $R_{12}=-0.62343$ | | | | |

ALBRECHT WILHELM TRONNIER.

REFERENCES CITED

The following references are of record in the file of this patent:

UNITED STATES PATENTS

| Number | Name | Date |
|---|---|---|
| 1,955,591 | Lee | Apr. 17, 1934 |
| 2,117,252 | Lee | May 10, 1938 |
| 2,194,413 | Warmisham et al. | Mar. 19, 1940 |

FOREIGN PATENTS

| Number | Country | Date |
|---|---|---|
| 439,556 | Germany | Jan. 13, 1927 |
| 423,468 | Great Britain | Feb. 1, 1935 |
| 427,008 | Great Britain | Apr. 12, 1935 |
| 665,520 | Germany | Sept. 27, 1938 |